United States Patent [19]
Bourcier et al.

[11] Patent Number: 5,192,359
[45] Date of Patent: Mar. 9, 1993

[54] RECOVERY OF ALUMINUM FROM FURNACE DROSS

[75] Inventors: Gilbert F. Bourcier, Richmond; John F. Krzyston, Chesterfield; Philip E. Smith; Larry C. Venable, both of Richmond, all of Va.

[73] Assignee: Reynolds Metals Company, Richmond, Va.

[21] Appl. No.: 897,228

[22] Filed: Jun. 11, 1992

[51] Int. Cl.⁵ ............................ C22B 7/00; B03C 1/02
[52] U.S. Cl. .................................. 75/10.67; 209/212; 209/227; 266/168
[58] Field of Search ........................ 75/10.67; 266/168; 209/12, 212, 227

[56] References Cited

U.S. PATENT DOCUMENTS

| | | | |
|---|---|---|---|
| 5,047,387 | 9/1991 | Talmy et al. | 209/212 |
| 5,049,540 | 9/1991 | Park et al. | 209/212 |
| 5,060,871 | 10/1991 | Brassinga et al. | 209/212 |

FOREIGN PATENT DOCUMENTS 265566  3/1989  Fed. Rep. of Germany ...... 209/212

Primary Examiner—Melvyn J. Andrews
Attorney, Agent, or Firm—Alan M. Biddison

[57] ABSTRACT

A method and apparatus for recovering metallic aluminum from furnace dross. The method includes reducing the particle size of the dross and passing the resulting dross particles over the surface of an inclined linear induction motor to separate the more conductive, aluminum-metal-containing particles from the less or non-conductive particles that contain little or no metallic aluminum. The linear induction motor provides an electromagnetic field that operates to levitate the conductive, aluminum-containing particles, while those particles that include little or no aluminum are not affected by the electromagnetic field. A flow splitter positioned at the lower end of the motor separates the conductive particles from the substantially non-conductive particles. Metallic aluminum recovery rates of about 55% and higher of the aluminum contained in the furnace dross have been achieved. The resulting product has been enriched by a factor of twelve times over that of the infeed material.

15 Claims, 3 Drawing Sheets

RECOVERY OF ALUMINUM FROM FURNACE DROSS

BACKGROUND OF THE INVENTION

1. Field of the Invention

The present invention relates to a method of and an apparatus for the recovery of metallic aluminum from furnace dross containing only a minor amount of aluminum. More particularly, the present invention relates to the recovery from furnace dross that includes a mechanical mixture of metallic aluminum, solidified salts, various oxides of aluminum and magnesium, various carbides, spinel, and other materials, of a component containing a relatively high metallic aluminum content, to minimize the amount of flux that must be disposed of after recovery of the metallic aluminum.

2. Description of the Related Art

The melting of aluminum-containing scrap materials, such as used aluminum alloy beverage cans and other products containing metallic aluminum, is often carried out in a reverberatory furnace. That type of furnace typically has an interior hearth connected to an external well, into which a charge of metal-containing materials, such as scrap aluminum beverage cans, is introduced. The charge is melted by supplying heated air to the space between the molten metal present in the hearth and the low roof of the furnace and circulating the heated metal from the interior to the exterior well. The heat source for heating the air is usually provided by the combustion of a fuel, such as natural gas, or the like. The metallic and other materials included in the scrap charge, including fluxes, are maintained in the hearth in a molten state for a predetermined time.

During the melting process the added salt flux forms an increasingly viscous, black mass of furnace dross that includes entrained oxides, aluminum-magnesium spinels, dirt, and other materials introduced with the scrap. The viscous dross layer impedes the assimilation into the melt of additional scrap material, and thereby limits the quantity of scrap material that can be processed. In order to permit additional scrap to be added to the melt, the dross must be skimmed off the surface of the melt, after which additional scrap material can be added to provide the quantity of recovered molten metallic aluminum needed for subsequent use.

The viscous dross that is skimmed from the surface of the melt is a mixture of a residual, minor amount of metallic aluminum, along with various metallic salts and other waste materials. Upon cooling to ambient temperature the dross solidifies to form a black mass that can contain up to about 20% by weight metallic aluminum. The amount of metallic aluminum present in the dross is dependent upon furnace operating conditions, but typically it is in the range of about 10% by weight.

Recovery of the metallic aluminum contained in the dross has heretofore been effected by crushing, screening, re-crushing, and re-screening the dross (see FIG. 1) in order to reduce to fine particles the more friable salt flux so that it can be readily separated from the larger particles of the less friable metallic constituents. The latter include metallic skulls and an aluminum-containing portion that includes approximately 50% metallic aluminum. The aluminum-containing portion is fed into a rotary furnace, along with up to several times its weight of a salt flux, to enable the release and coalescence of the aluminum metal that is present.

After the removal of the metallic aluminum, there remains a resulting salt cake, based in part upon the flux carried over from the reverberatory furnace and also in part upon the flux carried over from the rotary furnace, and that salt cake must be disposed of. However, land disposal of rotary furnace salt cake residue, which contains less than about 5% aluminum, is becoming increasingly expensive, and is also the subject of environmental regulations.

It is an object of the present invention to recover from the reverberatory furnace dross as much of the metallic aluminum as reasonably possible, to minimize the amount of material to be processed in a rotary furnace, and also to minimize the amount of salt cake residue requiring disposal.

SUMMARY OF THE INVENTION

Briefly stated, in accordance with one aspect of the present invention, a method is provided for separating metallic aluminum from aluminum furnace dross in the form of a solidified mixture of aluminum and non-electrically-conductive materials. The method includes providing aluminum furnace dross in particulate form, the particles having a nominal particle size of less than about one inch. A linear electromagnetic force field defined by linearly travelling electromagnetic waves is generated, wherein the linear force field is provided by a linear induction motor that has a substantially planar surface inclined at an angle of from about 40° to about 60° relative to a vertical axis. The force field is oriented to levitate conductive particles above the surface of the motor and to provide moving electromagnetic waves that travel substantially parallel to the planar surface from a lower portion of the motor toward an upper portion of the motor.

The dross particles are dropped onto an upper portion of the planar surface of the motor so that particles having a substantial content of metallic aluminum are levitated above the planar surface of the motor and continue to fall in a generally downward direction along and substantially parallel to the planar surface of the motor.

Separation of the dross particles into at least two groups of particles is effected by providing a flow splitter that extends across and is spaced outwardly a predetermined distance from a lower portion of the planar surface of the motor. The groups of particles include a first group of particles that have been levitated above the planar surface by at least the predetermined distance by the electromagnetic field, and a second group of particles that have not been levitated above the planar surface by at least the predetermined distance. The groups of particles are separately collected.

In accordance with another aspect of the present invention, apparatus is provided for recovering metallic aluminum from aluminum furnace dross. The apparatus includes a unitary linear induction motor having a substantially planar operating surface, the planar operating surface defining an acute angle with a vertically extending axis. A power source provides electrical power having a frequency of at least about 700 Hz to the motor for providing a moving linear magnetic field for levitating, relative to the motor operating surface, dross particles including electrically conductive metallic aluminum.

A conveyor conveys furnace dross in particulate form to the linear induction motor and is disposed to enable dross particles to fall from an end of the conveyer onto the operating surface of the motor.

A particle flow splitter is positioned adjacent to a lower end of the linear induction motor and extends across and is spaced outwardly from the operating surface of the motor for separating the dross particles into two groups, a first group of particles that have been levitated by the linear induction motor, and a second group containing the remaining particles.

A collector is positioned downstream of the flow splitter for separately collecting each of the groups of separated particles

DESCRIPTION OF THE PREFERRED EMBODIMENTS

Figure 1:
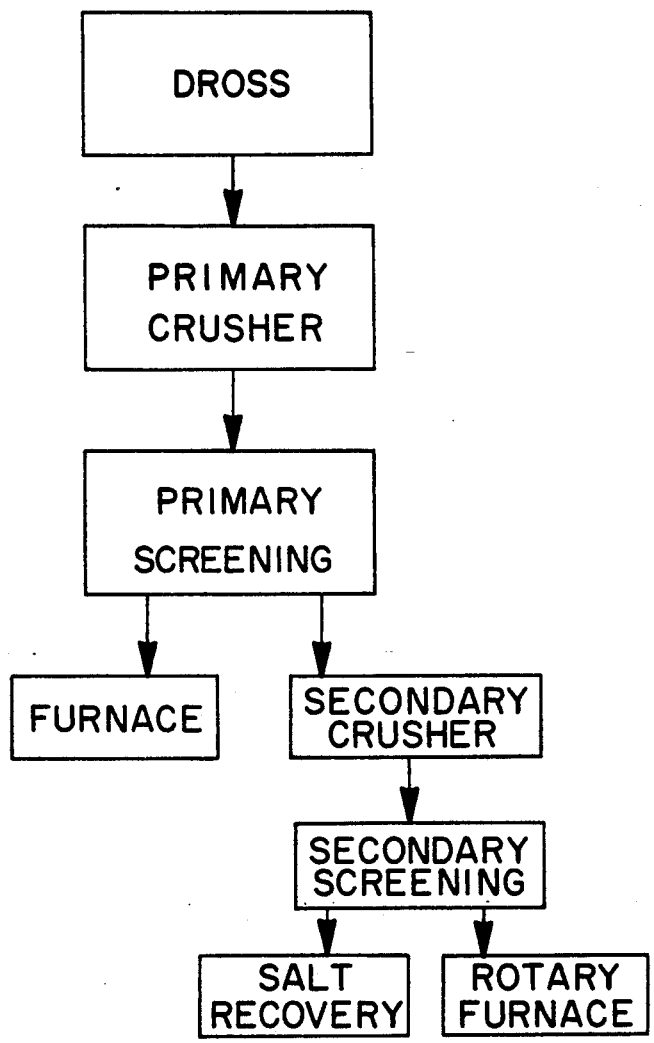
FIG. 1 is a block diagram showing the process steps for a prior art process for recovering aluminum from furnace dross.

Aluminum scrap to be recycled, for example crushed aluminum alloy beverage cans, is deposited in a suitable furnace, such as a reverberatory furnace, to be melted and to permit separation of the aluminum metal from impurities and other materials included in the scrap. Reverberatory furnaces typically have an exterior well that is connected with an interior hearth through a submerged arch in a common wall between the hearth and the exterior well.

The charge of scrap metal is deposited in the exterior well along with a salt flux. The form in which the scrap metal charge is supplied to the exterior well is not critical, and it can either be finely divided or in large pieces. Additionally, the charge can either be at ambient temperature or it can be preheated, if desired.

Since the metallic aluminum pieces contained in such scrap typically have an outer aluminum oxide layer or film, a flux is needed to dissolve or liquify the oxide layer to enable the aluminum metal present within the scrap to coalesce with the molten metal already present in the well of the furnace. The need for a flux becomes more critical as the number of more finely divided pieces of metallic aluminum within a charge of scrap increases, because a large number of smaller pieces have a greater aggregate surface area, and thus present a greater quantity of aluminum oxide.

A typical salt flux that is suitable in scrap aluminum recovery operations generally includes sodium chloride (NaCl), potassium chloride (KCl), and either cryolite ($Na_3AlF_6$) or a cryolite-like compound, such as $NaAlF_4$. The sodium and potassium chlorides in the flux are provided in a near eutectic mixture of 57%:43% NaCl:KCl, respectively, in order to lower the melting point of the charge. The cryolite or cryolite-like compound forms a ternary mixture and serves to dissolve the aluminum oxide skin on the scrap, thereby to enable the scrap to coalesce with the molten metal in the furnace.

The salt flux can amount to about 5% or more of the input scrap weight, and it will operate to entrain the various oxides, dirt, and the like, as well as to help form aluminum-magnesium spinels, which also become entrained. The spinels cause the salt flux to become black in color, and the resultant product, called "black dross," is quite viscous. The viscous mixture of salt flux and other materials, or dross, floats on the surface of the molten aluminum. Because of its viscosity, the dross can impede the addition to the molten aluminum of additional scrap, and it is therefore skimmed off the molten aluminum surface.

The weight of the black dross that is removed from the furnace is often two or more times the weight of the input salt flux, because of the impurities entrained by the flux, including aluminum oxide, and also the entrainment by the flux of some metallic aluminum. The metallic aluminum present can amount to as much as 20% by weight of the black dross, depending upon furnace operating conditions, but typically it is about 10% by weight.

Black dross, following removal from a furnace charge well, tends to agglomerate while slowly cooling, unless it is treated by accelerated cooling and agitation at the time of removal to prevent such agglomeration. The black dross is also cooled to minimize thermiting losses, and is then subjected to particle size reduction, such as by comminution in a hammermill, or the like, preferably to a nominal particle size of about $\frac{3}{8}''$ or less. In that regard, the previously-employed method (see FIG. 1) included two distinct crushing operations for particle size reduction, along with an intermediate screening step. Additionally, that previous method also relied solely upon particle size reduction as the parameter by which to determine which fraction of the twice-crushed material was to be remelted for recovery of the metallic aluminum from the dross. In the method in accordance with the present invention only a single particle size reduction step is employed (see FIG. 2), and after screening the dross particles having the greatest amount of aluminum are separated by dropping the particles to fall into a moving electromagnetic field and then recovering those electrically conductive, aluminum-rich dross particles that have been displaced by that field.

Figure 2:
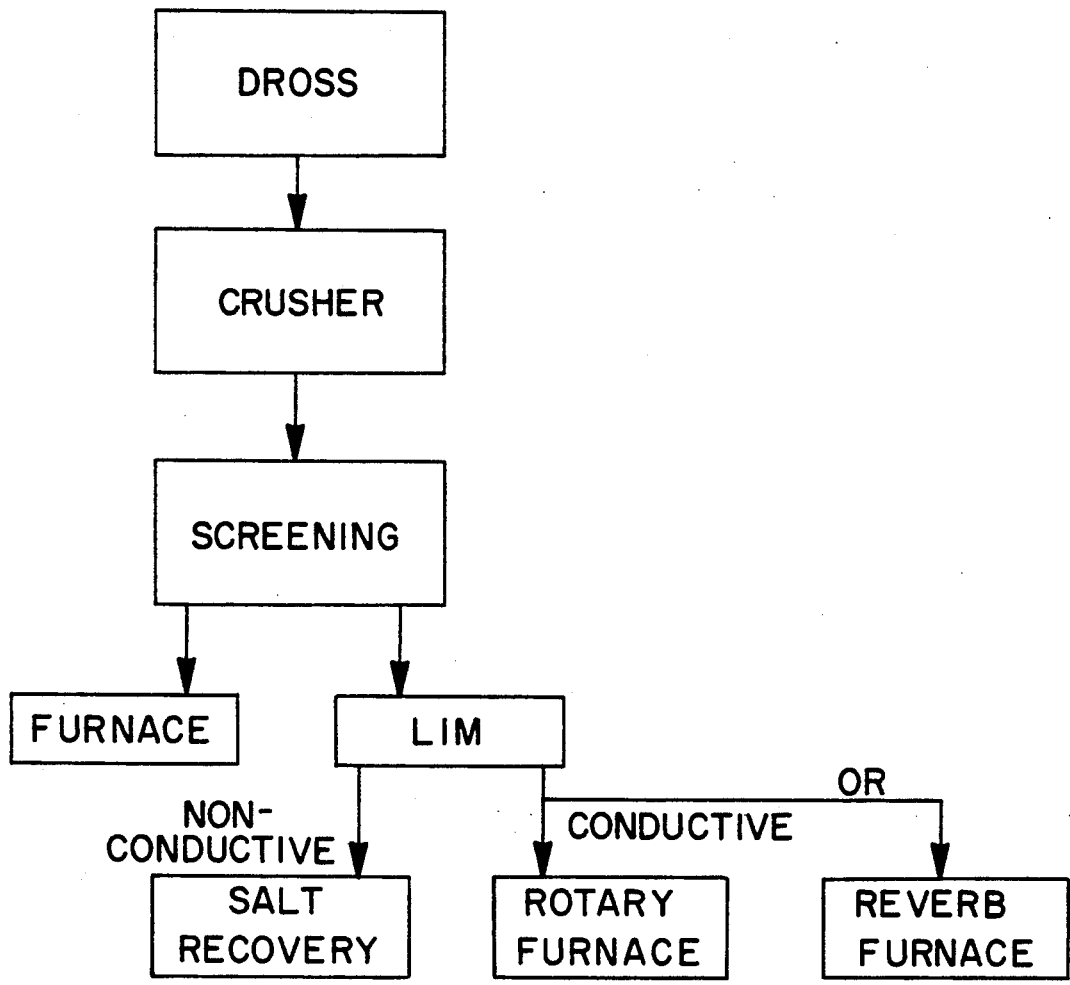
FIG. 2 is a block diagram showing the process steps for one embodiment of the process in accordance with the present invention for recovering aluminum from furnace dross.

Referring to the flow diagram in FIG. 1, the existing system crushes and screens material, sending $+\frac{3}{8}''$ material to a rotary furnace. The aluminum content of this fraction can vary considerably, thereby causing production uncertainties. The $-\frac{3}{8}''$ material is crushed for a second time, in a roller mill, to reduce the particle size of the salt to a screen size of $-60$ mesh, which is separated from the $+60$ mesh material. The latter typically contains about 50% aluminum, and is sent to a rotary furnace for recovery of the aluminum.

Figure 3:
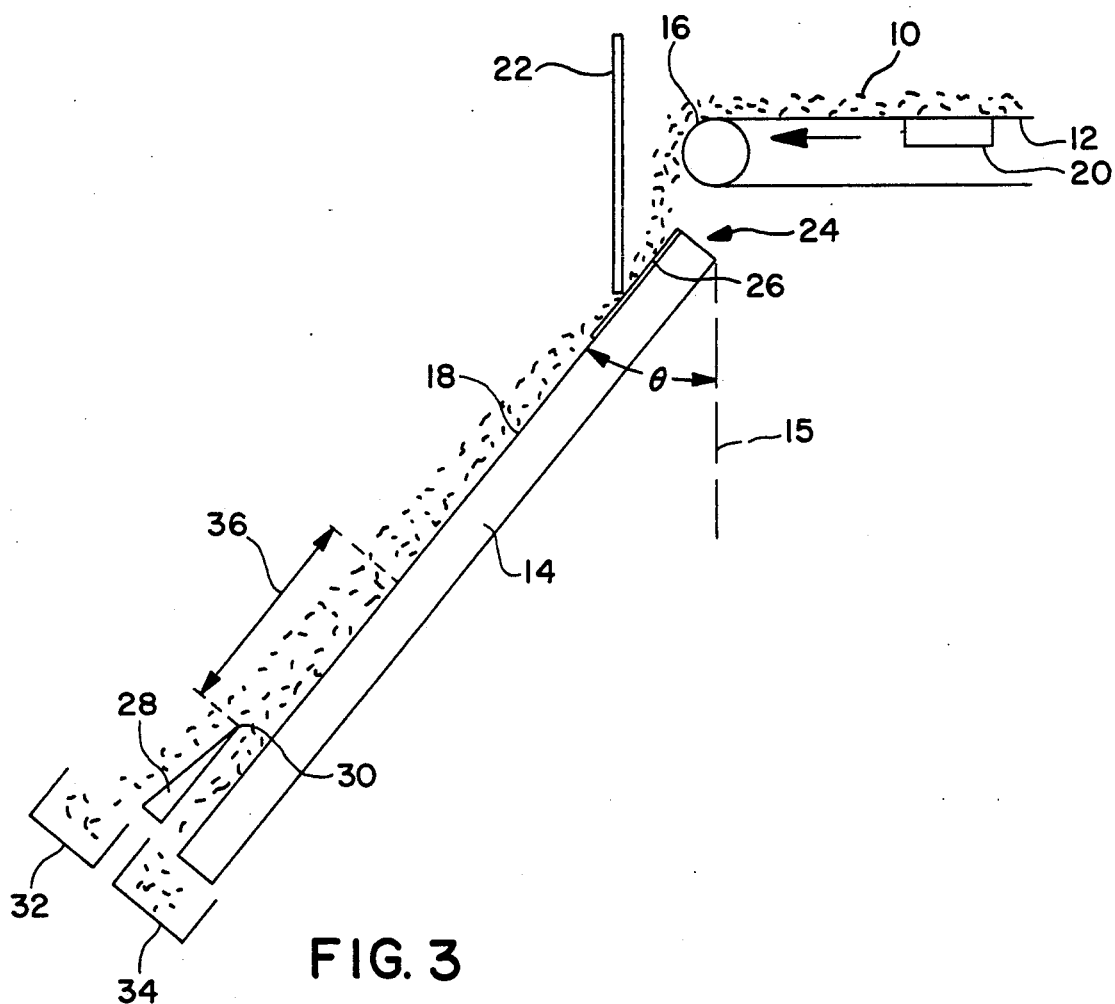
FIG. 3 is a schematic side elevational view showing apparatus in accordance with one embodiment of the present invention for separating aluminum-containing dross particles from comminuted furnace dross.

Referring to FIG. 3 of the drawings, in practicing the method in accordance with the present invention, comminuted dross particles 10 are deposited on conveying means, such as a substantially horizontal conveyor belt 12, and are conveyed to a single, high frequency, inclined, linear induction motor (LIM) 14. The angle of inclination $\theta$ of LIM 14 relative to a vertical axis 15 is between about 40° and about 60°, and preferably is about 56°.

The dross particles fall from the downstream end 16 of conveyor belt 12 and onto the inclined surface 18 of LIM 14, which is positioned below downstream end 16 of conveyor belt 12. Preferably, conveyor belt 12 includes a vibratory device 20, such as a vibrator sold under the trademark SYNTRON by FMC Corp., of Homer City, Pa., to substantially uniformly distribute the comminuted dross particles along and across the surface of conveyor belt 12.

A hanging curtain 22 in the form of a suspended sheet of rubber, fabric, rubberized fabric, or the like, is provided above inclined surface 18 of LIM 14. Curtain 22 is spaced outwardly of downstream end 16 of conveyor belt 12 and extends across inclined surface 18. The lowermost edge of curtain 22 is preferably slitted and touches or is closely spaced from surface 18 to significantly reduce or prevent bouncing of dross particles 10 away from inclined surface 18 after the particles fall from belt 12 onto surface 18 of LIM 14, and also to provide a substantially uniform, thin layer of dross particles on the upstream end 24 of LIM 14. Additionally, a rubber mat 26, or the like, can also be provided on the uppermost portion of surface 18 to further minimize bouncing of the dross particles away from inclined surface 18 of LIM 14.

Downstream end 16 of conveyor belt 12 is so positioned that the particles fall toward rubber mat 26 on surface 18 of LIM 14. After passing the lowermost edge of curtain 22 the dross particles 10 are at a point at which the electromagnetic field of LIM 14 is operative, and the field operates on and physically separates those dross particles that include significant amounts of electrically conductive aluminum from those dross particles that contain largely electrically-nonconductive materials and impurities.

The structure and operation of linear induction motors is described generally in U.S. Pat. No. 4,137,156, issued Jan. 30, 1979, and entitled, "Separation of Non-Magnetic Conductive Metals," the disclosure of which is hereby incorporated herein by reference. In that regard, linear induction motors suitable for practicing the present invention are available from Calumet Armature, Inc., of Chicago, Ill., and from Force Engineering Limited, of Shepshed, Leistershire, England.

After the comminuted dross material falls from downstream end 16 of conveyor belt 12 toward inclined surface 18 of LIM 14, the electromagnetic field of the LIM acts on the particles in such a way as initially to levitate or elevate upwardly away from inclined surface 18 those dross particles that contain the electrically conductive metallic aluminum. The dross particles containing large amounts of metallic aluminum are elevated a greater distance from inclined surface 18 than are those dross particles containing a lesser amount or no metallic aluminum.

The unitary LIM as utilized in the present invention provides a linear electromagnetic field that acts on the comminuted dross mixture to affect the particles in the manner illustrated generally in FIG. 3. Most of the previously-disclosed LIM-based separation arrangements of which the inventors are aware have made use of a pair of opposed LIMs, between which particles are adapted to pass. In that arrangement, shown generally in U.S. Pat. No. 4,137,156, the electrically conductive particles are separated from electrically-non-conductive particles by virtue of their greater linear acceleration by the combined magnetic fields of the opposed LIMs, whereas the non-conductive particles are not affected by the fields and are not accelerated, thereby falling in a different direction from the direction of movement of the accelerated conductive particles. Further, when a pair of opposed LIMs is provided, any levitating effects of the individual LIMs are canceled or offset by the opposed LIM, and the conductive particles that pass therebetween are simply linearly accelerated in the direction of the magnetic lines of force provided by the LIM. Additionally, placing LIMs in opposed relationship limits the frequencies at which the LIMs can be operated, because of the interfering effects between the fields.

In addition to levitating the aluminum-containing dross particles, the electromagnetic field provided by LIM 14, which preferably is at a frequency of from about 700 to about 900 Hz, is so oriented that the magnetic lines of force extend substantially parallel with the surface 18 of LIM 14. The field thus also acts on the electrically conductive particles in such a way as to accelerate and propel the elevated particles in an upward direction, substantially parallel with inclined surface 18 of the LIM. This upward thrust of the conductive component enables gravity to keep the nonconductive material separated.

The levitation above inclined surface 18 of those dross particles is sufficient to cause them to be positioned above leading edge 30 of particle flow divider means or splitter 28, which preferably is spaced outwardly from inclined surface 18 on the order of about ¾ to about 1 inch. Preferably, leading edge 30 of splitter 28 extends laterally across the entire width of LIM 14. The electrically conductive dross particles that are elevated to a height above leading edge 30 of splitter 28, as viewed in FIG. 3, are consequently physically separated by the flow splitter from the remaining particles, which pass between splitter 28 and inclined surface 18. The latter particles either are electrically non-conductive or are only marginally conductive, and because of their low conductivity they have not been levitated a sufficient distance above surface 18 to pass above the leading edge 30 of splitter 28. Each of the groups of particles is collected in a respective separate collector 32, 34.

For improved separation of the conductive dross particles from the remaining dross particles, it has been found that positioning the leading edge 30 of flow splitter 28 downstream of the horizontal centerline of the LIM provides better results. A suitable length, identified in FIG. 3 by dimension arrow 36, is about 2.75 inches. This distance can vary, depending on the number of poles of the LIM. By that position along inclined surface 18 the conductive particles will have been levitated in proportion to their electrical conductivity to permit effective separation of the dross particles to occur.

The particles containing a large proportion of metallic aluminum usually also include a thin surface coating of salt, resulting from the presence of the aluminum as a molten drop that solidifies while within the liquid or semi-liquid salt. As the liquid, or molten salt, solidifies around the already solidified aluminum, some of the salt forms a tightly adhering surface coating.

After the separation performed by the apparatus shown in FIG. 3, the aluminum-containing particles are carried to and can be placed in a reverberatory furnace well to recover the metallic aluminum for reuse. The greatly reduced quantity of black dross, relative to that encountered with the conventional rotary furnace process, is then processed to recover aluminum present, with residuals suitably disposed of.

The action of the electromagnetic field of a LIM is most pronounced on aluminum that is not contaminated with salt or other non-conductive surface residues or coatings. As the salt residue present in furnace dross builds up on an aluminum particle, the conductive aluminum component of that particle becomes a decreasing percentage of the particle weight and volume, and such coated particles are less likely to be sufficiently elevated or accelerated by an electromagnetic field, as compared with an uncontaminated aluminum particle of similar mass. In that regard, the use of a nominal 800 Hz LIM provides a higher rate of recovery of such coated conductive particles smaller than ½" than would a 60 Hz LIM.

Table 1 below summarizes the operating results of a series of tests conducted to determine the optimum operating parameters for a LIM-based system for recovering aluminum from furnace dross. The independent system variable examined was the gap between the splitter and the surface of the LIM over which the material passes. (See FIG. 3).

TABLE 1

LIM CONDITIONS
Model - Calumet 800 Hz
Capacitors - Standard Power Factor Correction (Adjustable)
Field Direction - Vertical
LIM Surface Orientation - 56.5° from Vertical
Rubber Mat On LIM Infeed Chute
Conveyor Syntron Setting - 5

| | SPLITTER SPACING FROM LIM | |
|---|---|---|
| | ¾" | 1" |
| Input Dross | | |
| Weight - lbs. | 120 | 120 |
| % aluminum in dross | 6.75 | 6.63 |
| lbs. aluminum in dross | 8.1 | 7.95 |
| Separated Conductive Material | | |
| weight - lb. | 6.0 | 5.53 |
| % of input dross weight | 5.0 | 4.61 |
| recovered aluminum weight - lb. | 4.6 | 4.3 |
| % of separated material (assay) | 76.7 | 77.7 |
| % of total aluminum in dross | 56.8 | 54.1 |
| Separated Non-Conductive Material | | |
| weight - lb. | 114 | 114.5 |
| % of input dross weight | 95 | 95 |
| recovered aluminum weight - lb. | 3.43 | 3.65 |
| % of separated material (assay) | 3.0 | 3.2 |
| % of total aluminum in dross | 43.2 | 45.9 |

The data presented in Table I show that an initial dross sample containing less than about 7% aluminum by weight, as determined by assay recovery, can be processed by the method and apparatus as disclosed herein in accordance with the present invention, to provide a furnace-ready product containing about 77% aluminum, as determined by assay recovery. The smaller quantity (about 5% of the initial dross material) of such separated material that must be processed to recover a high percentage of the aluminum content of the initial dross material results in less flux usage during the aluminum recovery operation, as compared with processing of the entire quantity of dross, thereby reducing the amount of dross and/or salt cake that must be disposed of.

An equivalent improvement would be expected when aluminum-rich dross containing as much as about 40%–50% recoverable aluminum is used as a feedstock.

The method in accordance with the present invention can accommodate a larger particle size of the dross material that emanates from the crusher and screening subsystem than can be accommodated in the prior art process (¼ inch vs. ⅜ inch), and the inventive method operates to separate from the dross material a furnace-ready metallic aluminum product. The previously-utilized method required additional crushing, to further pulverize the friable salt, since the separation of the salt particles from the aluminum-containing particles was based entirely upon the particle size.

Although the tests reported herein were conducted on −⅜" material, because that was the available intermediate product of the previous method, material feedstock having that particle size is not necessary for the practice of the present invention. As noted above, in practicing the method disclosed herein the separation of the aluminum from the dross and other materials is not particle size dependent. Instead, the separation is based upon the electrical conductivity of the particles, which is dependent principally upon the quantity of aluminum present in the respective particles. Further, the inventive method is believed to be operable with particles having a nominal particle size even greater than about 1 inch.

Referring to FIG. 3, in practicing the method in accordance with the present invention the LIM is placed at an angle to the infeed stream, with the electromagnetic field directly above the LIM where it can react on the conductive material present in the infeed stream of particles. The splitter is fixed in position, but it is adjustable to vary the gap between the splitter and the upwardly-facing surface of the LIM. Furthermore, the splitter is positioned in such a way as to keep the separated, more conductive material from recombining with the less conductive or non-conductive material.

The electrical supply to the LIM can range in frequency from as low as about 60 Hz to up to about 900 Hz, with the internal circuitry adjusted with capacitors that allow power factor adjustment approaching unity or as close to unity as possible, consistent with desired LIM flux field intensity and size. However, it has been found that better results are obtained when higher frequencies are employed, and 800 Hz is an especially preferred frequency because it has been found to operate to separate particles having a small, but still significant quantity of aluminum. When lower frequencies are employed the particles containing the lesser quantities of aluminum are not levitated to the same extent as when 800 Hz is employed, and consequently those particles pass below the splitter and the aluminum metal they contain is not recovered. In that regard, the use of a frequency of 800 Hz permits the separation and recovery of aluminum having a salt coating constituting as much as 20 to 30% of the total weight of the individual particles, and having a particle size range of from about 28 mesh (U.S.S.) to up to several inches square.

The method in accordance with the present invention operates to separate from the residual salt flux the metallic aluminum fraction present in dross on the basis of the electrical conductivity of aluminum and the non-conductivity of the salt and other materials. Previously, this type separation was based on the relative friability of the salt flux and the resistance of the aluminum to be readily crushed to a fine size. The separation was then effected by screening, with cross contamination resulting since not all of the salt was effectively crushed, nor did all of the aluminum remain uncrushed.

An example illustrating the practice of the present inventive apparatus and method is presented below:

EXAMPLE

Separation apparatus was arranged in accordance with the physical arrangement shown schematically in FIG. 3. A belt conveyor incorporating a Syntron vibratory feeder was provided to carry dross in particulate form from a crusher to a linear induction motor. The dross had an average particle size of about $-\frac{3}{8}''$ and contained about 6.6% aluminum, by weight.

A rubber curtain was provided downstream of the conveyor to level the material so that it was substantially uniformly distributed across the conveyor exit as the material fell by gravity from the end of the conveyor belt onto the inclined surface of the LIM.

Twenty pounds of dross particles were deposited on the moving conveyor belt. The Syntron vibrator was set at setting 5, and the LIM, a Calumet Armature Co. LIM, was operated at a frequency of 800 Hz. with the field direction vertical. The splitter was positioned so that its leading edge was spaced $\frac{3}{4}$ inch above the inclined, upwardly facing surface of the LIM, which defined an angle of 56.5° with a vertical plane.

The 20 lb. of dross particles were deposited on the LIM by the movement of the conveyor belt, and the electrical field generated by the LIM caused those particles containing a relatively large amount of aluminum to be levitated above the surface of the LIM and to be accelerated in a direction along the inclined surface of the LIM toward and above the leading edge of the splitter for collection. A total of 1.15 lb. of particles (5.7% of the dross particles) that passed above the splitter was collected. Those particles having a lesser amount of aluminum, or no aluminum at all, were not levitated, or were levitated to a lesser degree, and passed below the leading edge of the splitter for collection separate from the particles that passed above the splitter. The balance of 19.06 lb. of particles (94.3% of the dross particles) passed below the splitter.

Analysis of the respective groups of particles revealed the following:

|  | Above splitter | Below splitter |
| --- | --- | --- |
| aluminum - lb. | 0.89 | 0.03 |
| aluminum - % of material | 77.4 | 2.2 |

It will be apparent that the present invention provides a method that permits recovery of a larger amount of the metallic aluminum contained within furnace dross, and it does so with fewer steps than previously-employed processes. Additionally, the method accomplishes greater recovery of aluminum while simultaneously utilizing a smaller quantity of flux, thereby reducing the amount of salt cake that must be disposed of.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method of separating from aluminum furnace dross particles containing substantial amounts of metallic aluminum, said method comprising:

a. providing aluminum furnace dross in particulate form, the particles having a nominal particle size of less than about one inch;

b. generating a linear electromagnetic force field defined by linearly travelling electromagnetic waves, wherein the linear force field is provided by a linear induction motor that has a substantially planar surface inclined at an angle of from about 40° to about 60° relative to a vertical axis, the electromagnetic force field oriented to levitate conductive particles above the surface of the motor and to provide moving electromagnetic waves that travel substantially parallel to the planar surface from a lower portion of the motor toward an upper portion of the motor;

c. dropping the dross particles onto an upper portion of the planar surface of the motor so that particles having a substantial content of metallic aluminum are levitated above the planar surface of the motor and are allowed to fall in a generally downward direction along and substantially parallel to the planar surface of the motor;

d. separating the dross particles into at least two groups of particles by providing a flow splitter extending across and spaced outwardly a predetermined distance from a lower portion of the planar surface of the motor, the groups of particles including a first group of particles that have been levitated above the planar surface by at least the predetermined distance by the electromagnetic field, and a second group of particles that have not been levitated above the planar surface by at least the predetermined distance; and e. separately collecting the first and second groups of dross particles.

2. A method in accordance with claim 1 wherein the nominal particle size of the dross particles is about $\frac{3}{8}$ inch.

3. A method in accordance with claim 1 wherein the angle of inclination of the motor surface is about 56°.

4. A method in accordance with claim 1 including the step of conveying to a furnace the first group of particles to recover metallic aluminum contained therein.

5. A method in accordance with claim 1 wherein the electromagnetic field has a frequency of from about 700 to about 900 Hz.

6. A method in accordance with claim 1 wherein the electromagnetic field has a frequency of about 800 Hz.

7. A method in accordance with claim 1 wherein the predetermined distance at which the flow splitter is positioned above the substantially planar surface is a distance of up to about 1.25 inches.

8. A method in accordance with claim 1 including the step of cushioning the impact of the dross particles as they are dropped onto the planar surface of the motor by providing a rubber cushioning mat on an upstream portion of the substantially planar surface to minimize bouncing of the dross particles as they fall onto the planar surface of the motor.

9. Apparatus for recovering metallic aluminum from aluminum furnace dross, said apparatus comprising:

a. a unitary linear induction motor having a substantially planar operating surface, the planar operating surface defining an acute angle with a vertically extending axis;

b. a power source for providing electrical power having a frequency of at least about 700 Hz to the motor for providing a moving linear electromagnetic field for levitating, relative to the motor operating surface, dross particles including electrically conductive metallic aluminum;

c. a conveyor for conveying furnace dross in particulate form to the linear induction motor and disposed to enable dross particles to fall from an end of the conveyer onto the operating sur the motor;

d. a flow splitter positioned adjacent to a lower end of the linear induction motor and extending across and spaced outwardly from the operating surface of the motor for separating the dross particles into two groups, a first group of particles that have been levitated by the linear induction motor, and a second group containing the remaining particles; and e. a collector positioned downstream of the flow splitter for separately collecting each of the groups of separated particles.

10. Apparatus in accordance with claim 9 wherein the acute angle ranges from about 40° to about 60°.

11. Apparatus in accordance with claim 9 wherein the acute angle is about 56°.

12. Apparatus in accordance with claim 9 wherein the frequency of the electromagnetic field is from about 700 to about 900 Hz.

13. Apparatus in accordance with claim 9 wherein the frequency of the electromagnetic field is about 800 Hz.

14. Apparatus in accordance with claim 9 including a cushioning mat positioned on an upstream portion of the motor operating surface to cushion falling dross particles to minimize bouncing of the particles.

15. Apparatus in accordance with claim 9 wherein the flow splitter has a leading edge that is positioned below a horizontal centerline of the LIM by a distance of at least about 2.75 inches.

* * * * *